UNITED STATES PATENT OFFICE.

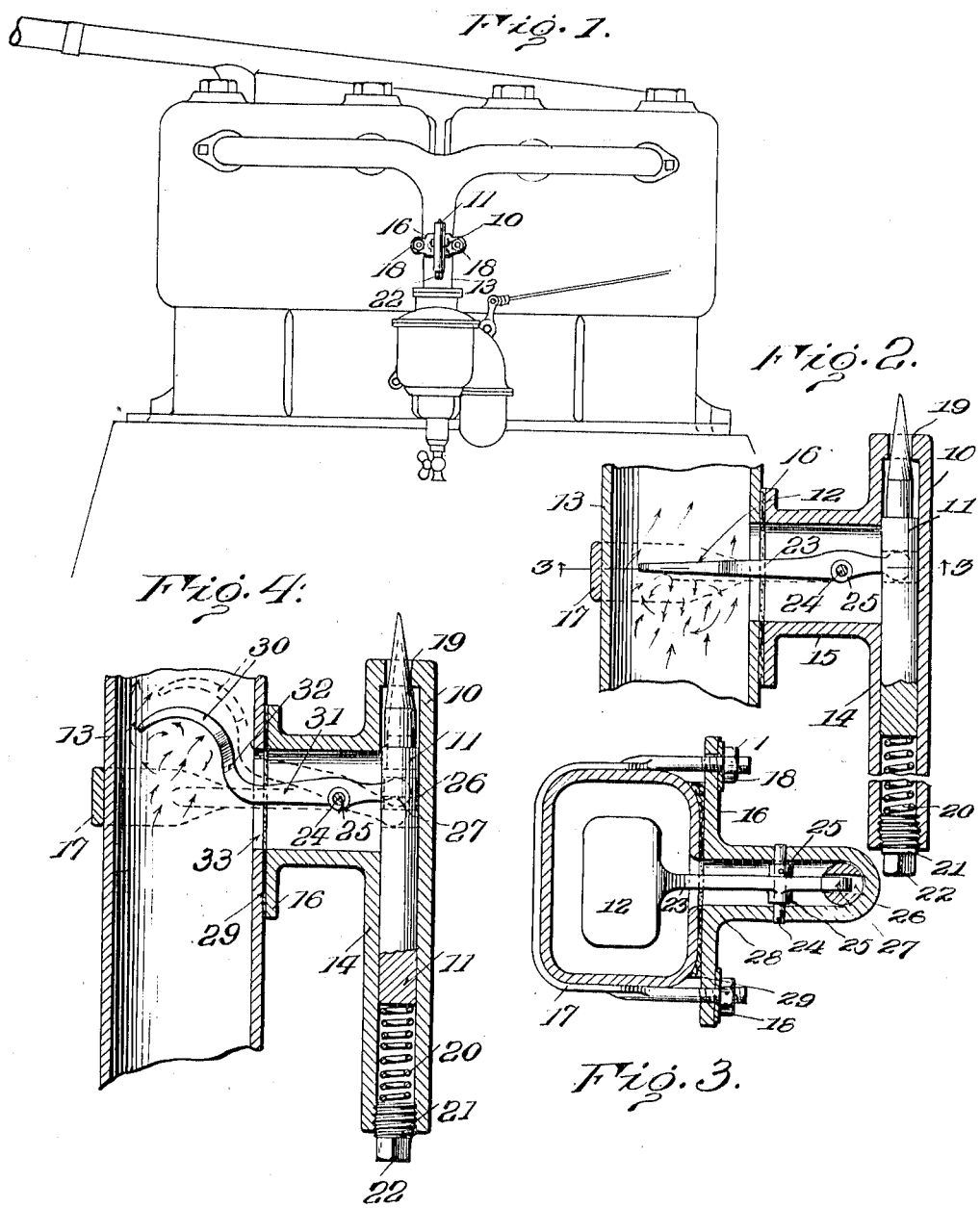

ETHAN E. SLY, OF NORWALK, OHIO.

AUTOMATIC AUXILIARY AIR-VALVE FOR INTERNAL-COMBUSTION ENGINES.

1,102,303. Specification of Letters Patent. Patented July 7, 1914.

Application filed January 10, 1914. Serial No. 811,298.

*To all whom it may concern:*

Be it known that I, ETHAN E. SLY, citizen of the United States, residing at Norwalk, in the county of Huron and State of Ohio, have invented certain new and useful Improvements in Automatic Auxiliary Air-Valves for Internal-Combustion Engines, of which the following is a specification.

The present invention relates to new and useful improvements in automatic auxiliary air valves of the type employed in connection with internal combustion engines.

Within the knowledge of the inventor, there are on the market numerous auxiliary air valves which operate automatically to admit an additional supply of air into the intake manifold for the purpose of thinning the mixture when the engine is running at high speed. However, so far as is known by the present inventor, these valves, without exception, are open to one main objection; viz, they operate entirely in response to increased suction in the intake manifold. It is also assumed in the construction of the auxiliary air valves at present on the market that it is always desirable to thin the mixture when the suction in the intake manifold is relatively high. Such is not the case, however. If the engine is running at high speed on closed throttle, it is obvious that the vacuum in the intake manifold will be greater than at any other time, but under such conditions the mixture is already very lean, and to admit an additional supply of air, thus thinning out the mixture, would produce no other result than the loss of the desired power in the engine. It is obvious, therefore, that an auxiliary air valve which is to be of maximum efficiency must be so constructed that its movement into open position is controlled by two factors; first, the extent of suction through the manifold pipe, and hence the velocity of the mixture particles, and second, the density of the mixture. In other words, an air valve to be efficient must not open merely in response to the increased velocity of the mixture particles through the manifold pipe, but must remain closed unless a relatively rich mixture is drawn through the intake manifold at a relatively high velocity.

As its principal object, therefore, this invention aims to provide an auxiliary air valve which will automatically open to admit an additional supply of air into the intake manifold when a relatively rich mixture is being drawn through the manifold at a relatively high velocity.

A further object is to construct an air valve consisting of a spring-pressed needle controlled by a swingingly mounted baffle which is arranged in the intake manifold, where it will be subject to the impact of the passing mixture particles, and will be swung to open the air valve when a mixture of pre-determined density is being sucked into the engine.

An object of equal importance with the foregoing is to provide an automatically operated auxiliary air valve controlled by a baffle plate which is arranged in the intake manifold, and is of such design that it will, as well as operating to open the valve, serve as a homogenizer by setting up swirls and eddies at the point of mixture of the additional air supply with the gasolene vapor passing through the manifold.

The above and additional objects are accomplished by such means as are illustrated in the accompanying drawings, described in the following specification, and then more particularly pointed out in the claims which are appended hereto and form a part of this application.

With reference to the drawings, wherein there has been illustrated the preferred embodiment of this invention as it is reduced to practice, and throughout the several views of which similar reference numerals designate corresponding parts, Figure 1 is a side elevation of an ordinary automobile engine, showing the auxiliary air valve of this invention in operative position on the intake manifold; Fig. 2 is a vertical section taken through the intake manifold and auxiliary air valve, showing the interior arrangement of parts; Fig. 3 is a section taken on the line 3—3 of Fig. 2; and Fig. 4 is a vertical section showing a modified form of valve.

Proceeding now to the description of the drawings, and referring particularly to Fig. 1, it will be seen that the auxiliary air valve of this invention is designed to be applied to the intake manifold of the engine below the Y. In its preferred embodiment, the auxiliary air valve includes a valve casing 10, a needle valve 11, and a swingingly mounted baffle plate 12, which is arranged in the intake manifold 13, and is operatively connected to the needle valve so that when the engine is running at a high speed and is sucking in a relatively rich mixture, the baffle plate will be swung upwardly and the needle valve moved into open position to admit an additional air supply for thinning the mixture. The valve casing 10 is preferably formed from a single casting, which includes a tubular body portion 14 and a cylindrical projection 15. The cylindrical projection 15 extends at right angles to the longitudinal axis of the body portion 14, and carries at its outer terminal a flange 16 which is apertured at its terminals to receive the arms of a U-shaped bolt 17. This U-shaped bolt is, as most clearly shown in Fig. 3, mounted to embrace the manifold pipe, and acts to hold the valve casing in the proper assembled position. Nuts 18 are, of course, threaded on the upper terminals of the U-shaped bolts to properly secure the flange 16 on the manifold pipe.

The needle valve 11 is preferably cylindrical in shape, and is tapered at its forward terminal, being adapted to seat in the inner end of an air inlet 19 which is formed in the end of the end of the valve casing 14, as particularly shown in Fig. 2. A helical spring 20 is interposed between the lower terminal of the needle valve 11 and the closure plug 21 of the valve casing. This closure plug 21 is threaded so that it may be removably applied to the lower terminal of the valve casing, and is formed with a squared terminal head 22, so that a wrench or similar tool may be employed for adjusting the tension of the spring 20. It will be obvious that the spring 20 normally acts to hold the valve in closed position, sealing the air inlet 19.

As previously stated, a baffle plate 12, is mounted for swinging movement in the manifold pipe. This baffle plate 12 is preferably formed of relatively light sheet metal, although, if so desired, some other material may be employed. In the preferred embodiment shown in Figs. 2 and 3, the baffle plate is substantially rectangular in shape, and is equipped with an integrally formed arm 23 which extends at right angles to the longitudinal axis of the plate, and is pivoted intermediate its length on a pivot pin 24 which extends transversely through the member 15. A pair of integral collars are formed on the arm 23, as indicated at 25. These collars are obviously provided for the purpose of spacing the arm equidistantly from each side of the projection 15, as shown in Fig. 3 particularly. A slot 26 extends transversely through the needle valve 11, and receives a substantially circular head 27 which is formed on the outer terminal of the arm 23.

From the foregoing description, it will be noted that the needle valve normally tends to remain in closed position through the tension of the spring 20. It will also be apparent that the degree of suction in the manifold pipe will alone have no effect on the baffle, but that this member will be swung upwardly on its pivot 24, moving the needle 11 downwardly to admit an additional supply of air only when a relatively rich mixture is being drawn through the manifold pipe at a relatively high speed. In explanation of this statement, it may be set forth that the baffle plate responds to the impact of the mixture particles, and is intended to operate solely on this principle, and not on the suction principle, as do all other auxiliary air valves known to the applicant. It now becomes apparent that the valve will not open when the engine is running on closed throttle, for the velocity of the mixture through the manifold will not be great enough to impart a sufficient impact upon the baffle plate to swing this member upwardly.

It will be noted that the adjusting plug 21 may be manipulated to increase or decrease the tension of the spring 20 to vary the point at which the needle valve 11 will open. It is necessary, of course, before mounting the auxiliary air valve on the manifold pipe to cut an elongated slot 28 in the pipe for the purpose of admitting the baffle plate and enabling the arm 23 to swing in the desired manner. It has been found desirable in most instances to interpose a gasket 29 between the flange 16 and the manifold pipe to insure the sealing of the slot 28.

The details of construction and the operation of the preferred form of valve being thus disclosed, reference will now be had particularly to Fig. 4, in which, as previously stated, there is illustrated a modified form of valve. This modified form of valve corresponds in its construction to the preferred form with but one exception, that is in the formation and peculiar shaping of the baffle plate which controls the needle valve. This baffle plate of the modified form of valve, which is designated by the numeral 30, is transversely curved instead of being flat, as is the preferred baffle plate. The arm 31 of the baffle plate 30, which corresponds to the arm 23 of the preferred form, is bent upwardly and substantially at right angles to its main length, as at 32, so that the baffle plate 30, when swinging upwardly in response to an increased velocity of the mixture particles, will be disposed above the opening 33 which is formed in the manifold pipe for admitting the arm 31. The purpose of thus curving the baffle plate 30 and bending the arm 31 to dispose the baffle above the opening 33, when the valve is in open position, is to provide means for producing a thorough and intimate mixture of the gasolene vapor and additional air. In this connection, it will be noted that inasmuch as the baffle plate 30 is transversely curved, and is arranged with its concave face in the path of the incoming air and passing gasolene, it will act to set up a number of swirls and eddies in the air and vapor, thus acting to thoroughly and intimately mix the two constituents.

In reduction to practice, it has been found that the form of this invention illustrated in the drawings, and referred to in the above description as the preferred embodiment, is the most efficient and practical; yet realizing that the conditions concurrent with the adoption of this device will necessarily vary, it is desirable to emphasize the fact that various minor changes in details of construction, proportion and arrangement of parts may be resorted to, when required, without sacrificing any of the advantages of this invention, as defined in the appended claims.

One of the possible modifications to which this invention may be subjected is the perforating of the baffle plate. It has been found in some instances that by perforating the baffle plate the homogenizing properties of the device are increased.

What is claimed is:—

1. The combination with the intake manifold of an internal combustion engine, of an air valve, and a swinging baffle plate arranged in the intake manifold and operatively connected to the valve.

2. The combination with the intake manifold of an internal combustion engine, of an air valve, and operating means for the valve, said means being controlled by the velocity of the mixture passing through the manifold.

3. The combination with the intake manifold pipe of an internal combustion engine, of an auxiliary air valve, and swingingly mounted means for operating the valve, said means being arranged in the manifold pipe, whereby the impact of the mixture particles will swing the said means to open the valve when the velocity of the mixture passing through the manifold pipe has reached a pre-determined point.

4. The combination with the intake manifold of an internal combustion engine, of a detachable auxiliary air valve, and movable means for opening the valve in response to a pre-determined velocity of the mixture particles through the manifold pipe.

5. The combination with the intake manifold pipe of an internal combustion engine, of an auxiliary air valve, yieldable means normally holding the valve in closed position, and means operatively connected to the valve and positioned in the manifold pipe for opening the valve when the velocity of the gas through the manifold pipe has reached a predetermined point.

6. The combination with the intake manifold pipe of an internal combustion engine, of a detachable auxiliary air valve, yieldable means normally holding the valve in closed position, and means positioned for swinging movement in the manifold pipe and pivotally connected to the valve for automatically opening the valve in response to a pre-determined velocity of the mixture through the manifold pipe.

7. The combination with the manifold intake of an internal combustion engine, of an air valve including a valve casing removably attached to the intake manifold pipe of an internal combustion engine, a spring-pressed needle valve controlling the air inlet of the casing, and a baffle plate pivotally connected to the valve and mounted for swinging movement in the manifold pipe, whereby the valve will be opened in response to the impact of the mixture particles against the baffle plate when the velocity of the mixture through the pipe has reached a pre-determined point.

8. An automatic auxiliary air valve for internal combustion engines including a normally closed spring-pressed valve, and movable means adapted to be positioned in the intake manifold pipe of an engine for operating the valve, said means being adapted to respond to the impact of the mixture particles when the velocity of the mixture through the pipe has reached a pre-determined point.

9. The combination with the intake manifold of an internal combustion engine, of a detachable auxiliary air valve including a valve member, and yieldable means normally holding the valve in closed position, and a baffle freely connected to the valve and arranged in the manifold for opening the valve in response to a pre-determined velocity of the mixture particles through the manifold pipe.

10. The combination with the intake manifold of an internal combustion engine, of a detachable auxiliary air valve including a valve member, and yieldable means normally holding the valve in closed position, and a baffle freely connected to the valve and arranged in the manifold for opening the valve in response to a pre-determined velocity of the mixture particles through the manifold pipe, said baffle being further adapted to deflect the additional air and passing mixture, whereby the mixture and additional air are agitated and consequently homogenized at the mixing point.

11. The combination with the intake manifold of an internal combustion engine, of an air valve including a spring-pressed valve member, and a movable baffle controlling the valve member and operating to open the valve in response to a pre-determined velocity of the mixture particles, said baffle including a pivoted arm freely connected at one terminal to the valve member, and a transversely curved plate formed on the other end of the arm.

12. The combination with the intake manifold pipe of an internal combustion engine, of an auxiliary air valve including a spring-pressed valve member, and a movable baffle controlling the valve, said baffle including a plate which is transversely curved and arranged in the manifold pipe with its concave face opposed to the direction of movement of the mixture.

13. The combination with the intake manifold of an internal combustion engine, of an auxiliary air valve including a valve member, and impact operating means controlling the valve, said means including a baffle plate positioned in the manifold and adapted to serve as a homogenizer for effecting a thorough and intimate mixture of the additional air and gasolene vapor.

14. The combination with the intake manifold of an internal combustion engine, of an auxiliary air valve including a valve member, and impact responsive means controlling the valve and arranged in the intake manifold pipe, said means including a curved baffle plate adapted to serve as a homogenizer for effecting an intimate mixture of the passing gasolene vapor and additional air.

15. The combination with the intake manifold pipe of an internal combustion engine, of an auxiliary air valve including a valve member, and a movable controlling means arranged in the manifold pipe and adapted to open the valve in response to the impact of the passing mixture particles.

16. The combination with the intake manifold of an internal combustion engine, of an automatic auxiliary air valve including a valve casing removably attached to the manifold pipe, a valve arranged in the casing, and a controlling member having its one terminal freely connected to the valve and its other terminal extending into the manifold pipe.

17. The combination with the manifold intake of an internal combustion engine, of an automatic auxiliary air valve including a valve casing adapted to be removably secured to the manifold, a valve arranged in the casing, and a controlling member for the valve, said controlling member being pivotally mounted in the valve casing and having its inner terminal pivotally connected to the valve, and a baffle plate formed at its other terminal and arranged for swinging movement in the manifold.

18. The combination with the intake manifold pipe of an internal combustion engine, of an auxiliary air valve including a valve casing, means for removably securing the casing on the manifold pipe, a spring-pressed needle valve carried by the casing, and a swinging controlling means for the needle valve.

19. The combination with the intake manifold pipe of an internal combustion engine, of an auxiliary air valve including a valve casing consisting of a tubular body member and a cylindrical projection adapted to register with the opening formed in the manifold pipe, means for detachably securing the casing to the pipe, a needle valve arranged in the tubular body member, and a baffle plate having an arm pivoted in the cylindrical projection and freely connected to the needle valve.

20. The combination with the intake manifold pipe of an internal combustion engine, of an auxiliary air valve including a valve casing, a needle valve mounted for reciprocation therein, yieldable means normally holding the valve in closed position, a baffle plate mounted for swinging movement in the manifold pipe, and an arm formed on the baffle and pivoted intermediate its length within the valve casing, said arm having a terminal head adapted to be freely seated in a recess formed in the needle valve.

21. The combination with the intake manifold pipe of an internal combustion engine, of an auxiliary air valve including a valve casing consisting of a tubular body member, a cylindrical projection extending laterally therefrom, an outwardly extending valve formed at the outer terminal of the projection, a U-bolt embracing the manifold pipe and having its terminals engaged with said flange, whereby the valve casing may be detachably secured in position on the manifold pipe to bring the cylindrical projection into registration with the opening formed in said pipe, a needle valve mounted in the tubular body member, and a baffle arranged in the manifold pipe and having an arm extending through the valve casing and pivoted intermediate its length in the cylindrical projection thereof, said arm being provided with a terminal head member adapted to be freely seated in a recess formed in the needle valve.

In testimony whereof I affix my signature in presence of two witnesses.

ETHAN E. SLY. [L. S.]

Witnesses:
 A. M. BEATTIE,
 CORT M. SCHOCK.